May 6, 1969  W. R. SPENCER  3,443,080
DIVIDING CIRCUIT PARTICULARLY ADAPTED FOR
MEASURING PRESSURE RELATIONSHIPS
Filed June 7, 1965
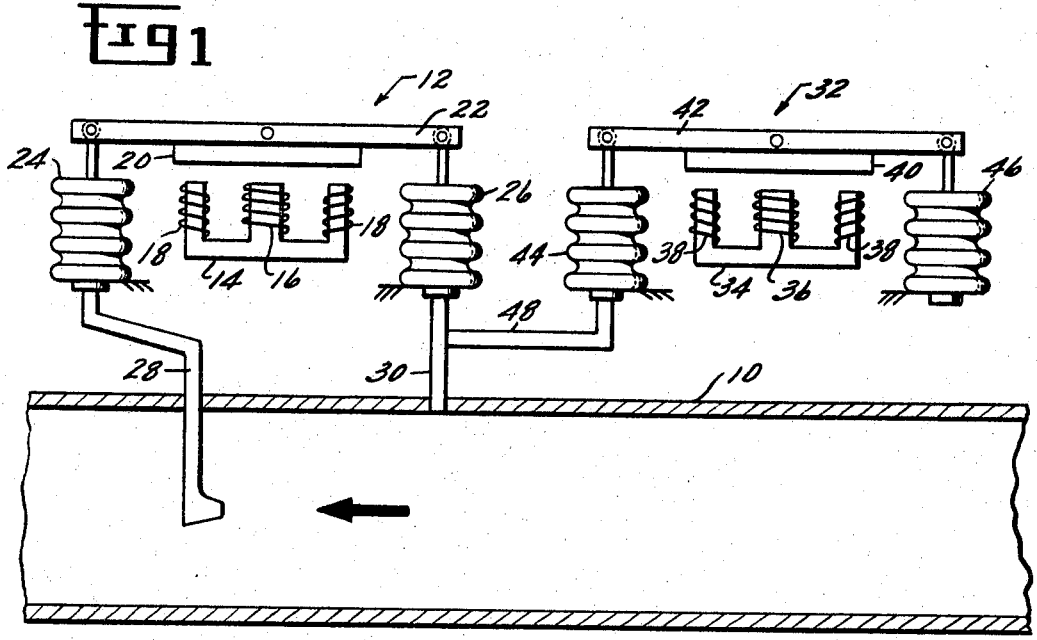
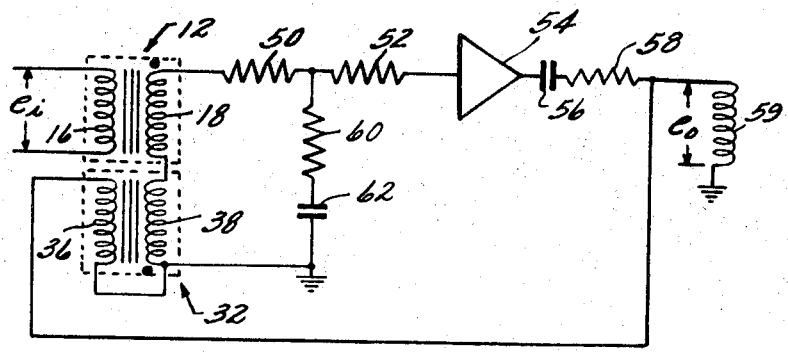
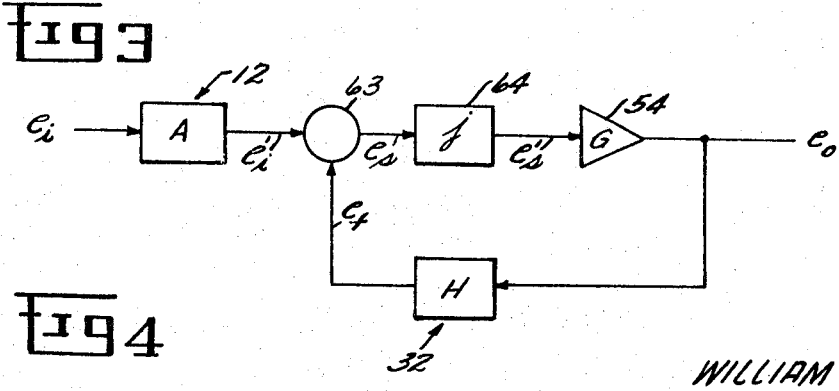
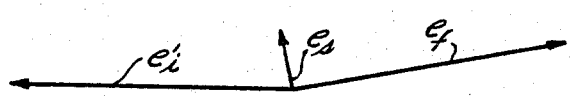
INVENTOR.
WILLIAM R. SPENCER
BY
ATTORNEY

United States Patent Office 3,443,080
Patented May 6, 1969

3,443,080
DIVIDING CIRCUIT PARTICULARLY ADAPTED FOR MEASURING PRESSURE RELATIONSHIPS
William R. Spencer, Cincinnati, Ohio, assignor to General Electric Company, a corporation of New York
Filed June 7, 1965, Ser. No. 461,796
Int. Cl. G06g 7/16, 7/57
U.S. Cl. 235—196                                                 8 Claims

ABSTRACT OF THE DISCLOSURE

The disclosure illustrates an electrical dividing circuit for calculating a signal approximating the Mach number of a gas stream flowing through a conduit. A pair of transducers respectively sense the differential between total and static pressure and static pressure, per se, in the conduit. The differential transducer is excited by a fixed input signal. The static pressure transducer is excited by the output of a fixed gain amplifier. The output signals of the two transducers are summed and then fed to a 90° phase shifting device which provides an input to the fixed gain amplifier. The ratio of the input to the output signal represents the relative gains between the two transducers and, therefore, represents the quotient of the differential pressure strength divided by the static pressure strength.

---

The present invention relates to improvements in electrical circuits, commonly referred to as dividing circuits, which are employed to measure the relative strength of two different signals.

While the invention has broad utility, it may best be understood by reference to its motivating environment which is in the field of turbojet engines. One parameter of turbojet engine performance is the rate of flow of gases through the engine as measured in terms of Mach number. It has long been established that a fixed relationship exists between Mach number ($N_M$) and the difference between total gas pressure ($P_T$) and static gas pressure ($P_S$) divided by static gas pressure which may be expressed as:

$$\left[1+\frac{\sigma-1}{2}N_M{}^2\right]^{\frac{\sigma}{\sigma-1}} - 1 = \frac{P_T - P_S}{P_S}$$

where $\delta = \dfrac{\text{specific heat at constant pressure}}{\text{specific heat at constant volume}}$ By measuring these pressures, Mach number can then be calculated and employed either in engine control or in the instrumentation for the engine. Pressure measurements, per se, present no problem and may be made in many ways. For present purposes it is desired that such measurements be made by means which develop electric signals proportionate to pressure. Actually, and preferably, transducers are employed to obtain two electric signals, one proportionate to static pressure ($P_S$) and the other proportionate to the difference between total pressure and static pressure ($P_T - P_S$).

These signals are fed to an electrical circuit which functions as a dividing circuit in accordance with the objects of the invention to develop an accurate voltage ratio proportionate to the pressure ratio $(P_T - P_S)/P_S$, which in turn is a specific function of the rate of gas flow expressed in terms of Mach number. The circuit advantageously provides the desired accuracy over a wide range of pressures while maintaining electrical signal strengths at a relatively low level which facilitates both safety and economy in over-all design.

In a broader sense the object of the invention is to provide a simple, low gain electrical circuit for dividing two electrical signals derived from transducers in an accurate manner particularly where the gain of the so-called divisor transducer is relatively low.

These ends are attained by a simple electrical circuit wherein a fixed input, A.C. reference signal is provided to a transformer transducer having a variable gain $A$ which gain, in the case of measuring Mach number, is proportionate to the difference between the total pressure and static pressure of a flowing gas stream. The circuit further comprises an amplifier having a fixed gain $G$ and a second transformer having a variable gain $H$. Again for purposes of measuring Mach number, the gain of the second transformer is proportionate to the static pressure of the flowing gas stream. The secondaries of these two transducer transformers are connected in series opposed relation and thereby summed.

This summation of the transducer outputs is then shifted 90° in its phase relationship and fed to the amplifier. The output of the amplifier is impressed on the primary of the second transducer transformer to provide the excitation therefor. The result of this phase shift is that the output signals are no longer 180° but vary from phase opposition by a factor of unity and $jGH$ ($j$ indicates a phase shift of 90°). The summation of the outputs of the two transducer transformers is a vector summation which provides an input signal strength to the amplifier which is sufficiently high for low values of $H$ to be free of noise interference and yet not result in excessive output signal strengths at high values of $H$.

The over-all advantages of this phase shift are further evident in the fact that the ratio of the output to input signal ratio accurately reflects the transducer gain raio $A/H$ which in turn reflects the pressure ratio $P_T - P_S/P_S$. The relationship (discussed in detail hereinafter) may be expressed as:

$$\frac{e_o}{e_i} = \frac{jAG}{1-jGH}$$

It will be apparent that when $GH$ is much greater than unity, $e_o/e_i$ is substantially equal to $A/H$. Since there is a 90° phase shift of $GH$ relative to unity, relatively low $GH$ values will give the desired accuracy.

The above and other related objects and features of the invention will be apparent from a reading of the following description of the disclosure found in the accompanying drawing and the novelty thereof pointed out in the appended claims.

In the drawing:
FIG. 1 is a diagrammatic view illustrating pressure sensing transducers employed in the present invention.
FIG. 2 is a diagram of the electrical circuit in which these transducers are incorporated;
FIG. 3 is a more basic block diagram of the circuit components seen in FIG. 2; and
FIG. 4 is a vector diagram illustrating signal relationships found in the present circuit.

As previously indicated this present invention has general utility as a dividing circuit as well as being uniquely adapted for the described purpose of providing electrical signals reflecting the Mach number of gases flowing through a jet engine. In connection with this more specific use, reference is made to FIG. 1 wherein a conduit 10 represents the shell of a jet engine with gases flowing therethrough in the direction indicated by the arrow.

A transducer 12 of known design is provided to develop a signal proportionate to the difference between the total gas pressure ($P_T$) in the conduit 10 and the static gas pressure ($P_S$) therein. The transducer 12 comprises an E core 14 having a primary winding 16 and secondary windings 18. A movable core 20 is mounted in a pivot bar 22 which is connected at its opposite ends to bellows 24 and 26 respectively. The bellows 24 is connected by tube 28 to sense the total pressure of gases flowing through the conduit 10. The bellows 26 is connected by tube 30 to sense static pressure of gases flowing through the conduit 10.

When there is no flow of gases through the conduit 10, the pressures in the bellows 24 and 26 respectively will be equal and the movable core 20 will be positioned so that the voltages in the secondary windings 18 will be nulled out. Whenever there is a gas gow through the conduit 10, the pressure in the bellows 24 will exceed that in the bellows 26 causing an output signal to be developed in the secondaries 18, which is proportionate to the difference between total gas pressure and static gas pressure. The strength of the output signal from the secondaries 18 relative to the strength of the input signal at the primary 16 is the gain of the transducer. As indicated above, the transducer itself is a known item and the present description will suffice to indicate to those skilled in the art the necessary mechanical and electrical components thereof for obtaining an output signal which increases in direct relation to the differential between total pressure and static pressure.

A second transducer 32 of similar known construction and preferably having like electrical characteristics is provided for obtaining an output signal proportionate to static gas pressure. The transducer 12 comprises an E core 34 having a primary winding 36 and secondary windings 38. A movable core 40 is mounted on a pivot bar 42 which is connected at its opposite ends to bellows 44 and 46 respectively. In the transducer 32 the bellows 44 is connected by a tube 48 to the tube 30 so that it is responsive to the same static pressure in the conduit 10 as the transducer 12. The bellows 46 is evacuated and the pivot bar 42 balanced so that movement thereof from null position reflects the absolute static pressure of the gases flowing through the conduit 10. Such movement of the pivot bar and the movable core 40 is reflected by a proportionately increasing output signal from the secondary windings 38.

Reference will now be made to FIG. 2, showing the transducers, i.e. transformers, 12 and 18 incorporated in an electrical dividing circuit for providing a ratio of output signal $e_o$ to input signal $e_i$ which accurately represents the ratio of $P_T - P_S / P_S$. The input signal $e_i$ is a constant strength alternating current signal with a fixed frequency which is generated by known means and impressed on the transducer primary 16. One end of the transducer secondary 18 is connected, through resistors 50, 52 to a conventional A.C. amplifier 54 which may be of the vacuum tube or transistor type, advantageously a transistor push-pull amplifier. The output of this amplifier passes through a condenser 56 and resistor 58 to a coil 59 across which the output signal $e_o$ is developed.

The output of the amplifier 54 is connected from resistor 58 to the primary 36 of the transducer 32 to provide the excitation therefor. The transducer secondary 38 is connected at one end to ground and at its opposite end in phase opposed relation to the transducer secondary 18.

The summed outputs of the secondaries 18 and 38 are developed across a resistor 60 and capacitor 62 to provide the input signal for the amplifier 54. The values of the resistors 50 and 60 and the condenser 62 are chosen to form a tuned circuit with the inductive secondaries 18 and 38 thus providing a minimum reactance and a phase shift of 90° between the summed signals of the secondaries 18, 38 and the signal, which is amplified by the amplifier 54.

The resistor 52 provides input impedance to the amplifier 54. The condenser 56 and resistor 58 are selected so that they function in combination with resistors 50, 60 and condenser 62 to shape the frequency response of the circuit to prevent oscillation.

FIG. 3 is a simplified block diagram of the circuit seen in FIG. 2 and provides a better understanding of the signal relationships whereby the objects of the present invention are obtained. The input signal $e_i$ is impressed on the transducer 12 which has a variable gain A dependent on the difference between total pressure $P_T$ and $P_S$ of the gases flowing through conduit 10. The output signal $e_i'$ of the transducer 12 is summed at a summation point 63 with the output signal $e_f$ of the second transducer 32 which has a variable gain H dependent on the static pressure $P_S$. (In FIG. 2 this summation is accomplished by the series opposed connection of the secondaries 18 and 38.)

From the summation point 63 the resultant signal $e_s$ is shifted 90° by means 64. (In FIG. 4 the tuned circuit including condenser 62 provides this shift.) From the phase shifting means 64 signal $e_s'$ is then amplified to provide the output signal $e_o$ which is also fed back as the input to transducer 32.

From the above, the following relationships will be apparent, wherein $j$ indicates a 90° phase shift:

The output signal $e_i'$ of transducer 12 is:

$$e_i' = e_i A$$

The output signal $e_f$ of transducer 32 is:

$$e_f = e_o H$$

The output signal $e_o$ is:

$$e_o = e_s' G$$

The input to amplifier 54 is:

$$e_s' = j e_s$$

Since there is a phase shift of the summation signal $e_s$ before amplification, the output signal $e_f$ of transducer 32 will be out of phase with the output of the transducer 12. The summation signal $e_s$ will be derived from the vector equation:

$$\vec{e_s} = \vec{e_i'} + \vec{e_f}$$

By appropriate substitution in the above equations, it follows that $e_f$ is almost 180° out of phase with $e_i'$. Thus:

$$e_f = \frac{e_i' jGH}{1 - jGH}$$

It also follows that $e_s$ is almost 90° out of phase with $e_i'$. Thus:

$$e_s = \frac{e_i'}{1 - GH}$$

These vector relationships are illustrated in FIG. 4, from which it will be appreciated that since $e_s$ is shifted 90° to obtain $e_s'$, the output signal $e_o$ will be almost 180° out of phase with the input signal $e_i$.

Appropriate substitution in the above equations will also show that the ratio of $e_o/e_i$ can accurately reflect the pressure ratio $P_T - P_S / P_S$. Thus:

$$\frac{e_o}{e_i} = \frac{jAG}{1 - jGH}$$

If GH is much larger than unity, then $e_o/e_i$ accurately approximates $A/H$ (with a phase shift of substantially 180°) and:

$$\frac{e_o}{e_i} \approx \frac{P_T - P_S}{P_S}$$

Because of the phase shift in the "divisor," $1 - jGH$, the effect of unity may be made negligible with a much lower value of GH than if a simple algebraic summation were involved. The ability to obtain accuracy with a lower loop gain, GH, enables the gain H to vary over a wide range without raising the maximum value of $e_o$ above undesirable limits while the minimum value of $e_s$ or $e_s'$ will be sufficiently high that it will not be affected by "noise" or other normal interference signals. Further, by maintaining the input and output signals $e_i$, $e_o$ substantially 180° out of phase, these signals may more effectively be employed in control circuits employing this divider circuit and more particularly as inputs to a function generator which will give an output proportionate to Mach number in accordance with the relationship to total and static pressures as set forth in the initial portion of this specification.

Various modifications of the constructional details herein described will occur to those skilled in the art.

Having thus disclosed the invention, what is claimed as novel and desired to be secured by Letters Patent of the United States is:

1. An electrical circuit comprising:
   amplifier means having a gain (G) and providing an output signal ($e_o$),
   means for providing an input signal to be amplified by said amplifier means,
   said last named means including means for summing a first signal ($e_i'$) and a second signal ($e_f$) to derive a summation signal ($e_s$) which will be amplified by said amplifier means,
   means having a gain (H) and an input from the amplifier output signal ($e_o$) for generating said second signal ($e_f$) and
   means for introducing a phase shift between the two signals which are summed, said phase shift having the relationship of (with $j$ indicating a 90° rephase shift):

$$e_f = \frac{je_i'GH}{1-jGH}$$

whereby a relatively low GH factor will minimize the differential between $e_i'$ and $e_o$, resulting from variations in G or H.

2. An electrical dividing circuit comprising:
   first and second signal generating means having variable gains and the outputs of which are summed,
   amplifier means for amplifying the summed outputs of said signal generating means,
   said first signal generating means having a fixed reference input,
   the output of said amplifier means providing the input to the second signal generating means, and
   means for creating a substantial phase shift between the two signals to thus increase the linearity in the ratio between the input signal to the first signal generating means and the output of the amplifier means.

3. An electrical dividing circuit comprising:
   a first transducer responsive to a fixed, A.C. input signal ($e_i$) and having a gain (A) to provide an output signal ($e_i'$),
   a second transducer having a gain (H) to provide an output signal ($e_f$),
   the gain of at least one of said transducers being variable dependent upon the value of a measured condition,
   means for summing the output signals of the two transducers to provide a summation signal ($e_s$),
   amplifier means having a gain (G) for amplifying the summation signal ($e_s$) to provide an output signal ($e_o$) which is also employed as the input signal to the second transducer, and
   means for shifting the summation signal ($e_s$) 90° prior to its amplification by the amplifier means,
   whereby (with $j$ indicating a 90° phase shift) the following relationship is obtained:

$$\frac{e_o}{e_i} = \frac{jGA}{1-jGA}$$

and a relatively low value of GH will cause the ratio of $e_o/e_i$ to be substantially equal to the ratio of the two transducer gains, $A/H$.

4. An electrical dividing circuit comprising:
   a first transducer responsive to a fixed A.C. input signal ($e_i$) and having a gain (A) dependent upon the value of a measured condition to provide an output signal ($e_i'$),
   a second transducer having a gain (H) to provide an output signal ($e_f$),
   the gain of at least one of said transducers being variable dependent upon the value of a measured condition,
   amplifier means,
   means for running the output signals of the two transducers to provide a summation signal ($e_s$),
   said summing means being connected to said amplifier means and the output of said amplifier means providing the input to said second transducer,
   and means for introducing a phase shift between the transducer signals which has a value (with $j$ equaling a 90° phase shift) of:

$$e_f = \frac{je_i'GH}{1-jGH}$$

whereby the transducer output signals will be vectorally summed and a relatively low GH value will result in an amplifiable summation signal ($e_s$) with a minimum difference in the strength of the transducer output signals.

5. An electrical dividing circuit comprising:
   a first transducer transformer having a primary across which said fixed A.C. input signal ($e_i$) is impressed and a secondary across which an output ($e_i'$) is developed,
   means for varying the gain (A) of the signal ($e_i$) developed in said secondary dependent upon the value of the measured condition,
   a second transducer having a primary and a secondary across which an output signal ($e_f$) is developed,
   means for varying the gain (A) of the signal ($e_i$) de- ($e_f$) dependent upon the value of a second measured condition,
   said secondaries being connected in series opposed relation to sum the output signals thereof and provide a summation signal ($e_s$),
   amplifier means having a fixed gain (G) for amplifying the summation signal ($e_s$) to provide an output signal ($e_o$) which is also impressed across the primary of the second transducer as the input signal thereto, and
   means for shifting the summation signal ($e_s$) 90° prior to its amplification by the amplifier means,
   whereby (with $j$ indicating a 90° phase shift) the following relationship is obtained:

$$\frac{e_o}{e_i} = \frac{jGA}{1-jGH}$$

and a relatively low value of GH will cause the ratio of $e_o/e_i$ to be substantially equal to the ratio of the two transducer gains, $A/H$, and the output signal ($e_o$) to be substantially 180° out of phase with the input signal ($e_i$).

6. An electrical dividing circuit as in claim 5 wherein:
   the secondaries of the two transducers are inductive and resistance and condenser means are connected thereacross to form a tuned circuit with a minimum of reactance and providing the 90° phase shift of the summation signal ($e_s$).

7. An electrical dividing circuit as in claim 6 wherein, considering the connection of the output of the amplifier means to the input of the second transducer a feedback loop is provided:
   resistance and capacitance means are provided between said connection and said amplifier means to shape the frequency response thereof and prevent oscillation of the amplifier means through the feedback loop.

8. An electrical circuit for indicating a Mach number as a function of the ratio of the difference between total gas pressure and static gas pressure ($P_T-P_S$) and static gas pressure ($P_S$) of gases flowing through a conduit,
   a first transducer responsive to a fixed A.C. input signal ($e_i$) and having vrible gin (A) which increases with increasing differentials between total gas pressure and static pressure to provide an output signal $(e_i')$, a second transducer having a variable gain (H) which increases proportionately with said static gas pressure to provide an output signal $(e_f)$, means for summing the output signals of the two transducers to provide a summation signal $(e_s)$, amplifier means having a gain (G) for amplifying the summation signal $(e_s)$ to provide an output signal $(e_o)$ which is also employed as the output signal to the second transducer, and means for shifting the summation signal $(e_s)$ 90° prior to its amplification by the amplifier means, whereby (with $j$ indicating a 90° phase shift) the following relationship is obtained:

$$\frac{e_o}{e_i} = \frac{jAG}{1-jGH}$$

and a relatively low value of GH will cause the ratio of $e_o/e_i$ to be substantially equal to the ratio of the two transducer gains $A/H$, and thus derive the relation:

$$\frac{e_o}{e_i} \approx \frac{P_T - P_S}{P_S}$$

References Cited

UNITED STATES PATENTS

| | | | |
|---|---|---|---|
| 2,787,673 | 4/1957 | Cutler | 330—107 X |
| 2,831,975 | 4/1958 | Catherall | 330—107 X |
| 2,905,385 | 9/1959 | Larse | 235—196 |
| 3,241,077 | 3/1966 | Smyth et al. | 328—155 X |

MALCOLM A. MORRISON, *Primary Examiner.*

J. F. RUGGIERO, *Assistant Examiner.*

U.S. Cl. X.R.

235—151.34

UNITED STATES PATENT OFFICE
CERTIFICATE OF CORRECTION

Patent No. 3,443,080                                    May 6, 1969

William R. Spencer

It is certified that error appears in the above identified patent and that said Letters Patent are hereby corrected as shown below:

Column 5, line 64, "1-jGA" should read -- 1-jGH --. Column 6, line 5, "running" should read -- summing --; line 11, after "transducer" insert -- output --; line 23, "said" should read -- a --; line 31, "gain (A)" should read -- gain (H) --; same line 31, before "signal" insert -- output --; same line 31, cancel "(ei) de-"; line 74, "vrible gin" should read -- variable gain --; same line 74, after "having" insert -- a --. Column 7, line 1, after "static" insert -- gas --; line 9, "output" should read -- input --.

Signed and sealed this 31st day of March 1970.

(SEAL)
Attest:

Edward M. Fletcher, Jr.                            WILLIAM E. SCHUYLER, JR.
Attesting Officer                                       Commissioner of Patents